United States Patent
Van Slooten et al.

(10) Patent No.: US 6,169,364 B1
(45) Date of Patent: Jan. 2, 2001

(54) ELECTRO-OPTICAL DISPLAY DEVICE WITH IONIZABLE GAS

(75) Inventors: Udo Van Slooten; Martinus H. Van Maaren; Petrus H. L. Notten, all of Eindhoven (NL)

(73) Assignee: U.S. Philips Corporation, New York, NY (US)

( * ) Notice: Under 35 U.S.C. 154(b), the term of this patent shall be extended for 0 days.

(21) Appl. No.: 09/096,072

(22) Filed: Jun. 11, 1998

(30) Foreign Application Priority Data

Jun. 12, 1997 (EP) .................................. 97201783

(51) Int. Cl.⁷ ......................................... H01J 17/49
(52) U.S. Cl. .......................... 313/582; 313/584; 313/643
(58) Field of Search ........................ 313/567, 581, 313/582, 583, 584, 585, 586, 587, 326, 331, 333, 352, 355, 643

(56) References Cited

U.S. PATENT DOCUMENTS

| | | | |
|---|---|---|---|
| 3,916,245 | * 10/1975 | Dorf et al. | 313/486 |
| 4,048,533 | * 9/1977 | Hinson et al. | 313/188 |
| 4,126,807 | * 11/1978 | Wedding et al. | 313/188 |
| 4,126,809 | * 11/1978 | Wedding et al. | 313/221 |
| 5,596,431 | 1/1997 | Bongaerts et al. | 349/32 |
| 5,898,271 | * 4/1999 | Mehrota et al. | 313/582 |
| 5,948,228 | * 9/1999 | Hinchliffe et al. | 204/485 |

FOREIGN PATENT DOCUMENTS

| | | | |
|---|---|---|---|
| 0780874A2 | 6/1997 | (EP) | H01J 17/20 |
| 0816898A2 | 1/1998 | (EP) | G02F 1/133 |
| 0833363A2 | 4/1998 | (EP) | H01J 17/49 |
| 2207496 | 2/1989 | (GB) . | |

\* cited by examiner

*Primary Examiner*—Michael H. Day
*Assistant Examiner*—Matthew T. Gerike
(74) *Attorney, Agent, or Firm*—John C. Fox

(57) ABSTRACT

A display device comprising a channel plate (39) having channels (30, 30', 30") containing an ionizable gas (33), and walls of the channels (30, 30', 30") being provided with electrodes (31, 32) for selectively ionizing the ionizable gas (33) during operation. The display device further includes an electro-optical layer and means for activating said electro-optical layer. The display device is characterized in that the ionizable gas (33) comprises a gas of the group formed by hydrogen, deuterium and deuterium hydrogen, and in that the display device is provided with means for supplying hydrogen, deuterium or deuterium hydrogen to the ionizable gas. Suitable materials include $VZ_2$, $LZ_3$, $PdZ_{0.6}$, $LaNi_5Z_6$, $LaNi_2Z_x$, $LaCo_5Z_x$, Zr—Mn—$Z_x$ or Pd—Ag—$Z_x$, where L is a lanthanide and Z is hydrogen and/or deuterium. The means are preferably situated in a recess (48) around the channel plate (39), in the pump connection (45) and/or they form part of the electrodes (31, 32).

20 Claims, 2 Drawing Sheets

ELECTRO-OPTICAL DISPLAY DEVICE WITH IONIZABLE GAS

CROSS-REFERENCE TO RELATED APPLICATIONS

This application is related to application Ser. No. 09/096,695 filed Jun. 12, 1998 by Gerritt H. Van Leeuwen et al for PLASMA DISPLAY WITH DISCHARGE MEDIUM CONTAINING HYDROGEN OR A HYDROGEN ISOTOPE, assigned to the assignee of the instant application.

BACKGROUND OF THE INVENTION

The invention relates to a display device comprising at least one compartment containing an ionizable gas, walls of the compartment being provided with electrodes for selectively ionizing the ionizable gas, during operation, and comprising an electro-optical layer of an electro-optical material, and means for activating the electro-optical layer.

Display devices for displaying monochromatic or color images include plasma-addressed liquid-crystal display devices, the so-called PALC-displays, which are preferably thin-type displays. PALC-displays are used as television and computer displays.

A display device of the type mentioned in the opening paragraph is disclosed in U.S. Pat. No. 5,596,431 (PHA 60 092). The thin-type display device described in said document comprises a display screen having a pattern of (identical) so-called data storage or display elements and a plurality of compartments. Said compartments are filled with an ionizable gas and provided with electrodes for (selectively) ionizing the ionizable gas during operation. In the known display device, the compartments are mutually parallel, elongated channels (formed in a so-called channel plate), which serve as selection means for the display device (the so-called plasma-addressed row electrodes). The application of a voltage difference across the electrodes in one of the channels of the channel plate, causes electrons to be emitted (from the cathode), which electrons ionize the ionizable gas, thereby forming a plasma (plasma discharge). If the voltage across the electrodes in one channel is switched off and the gas de-ionized, a subsequent channel is energized. At the display-screen side of the display device, the compartments are sealed by a (thin) dielectric layer ("microsheet") provided with a layer of an electro-optical material and further electrodes serving as the so-called data electrodes are column electrodes of the display device. Said further electrodes are provided on a substrate. The display device is formed by the assembly of the channel plate with the electrodes and the ionizable gas, the dielectric layer, the layer of the electro-optical material and the further electrodes A disadvantage of the known display device resides in that such display devices have a limited service life.

OBJECTS AND SUMMARY OF THE INVENTION

It is an object of the invention to provide, inter alia, a display device having a longer service life.

To achieve this, the display device in accordance with the invention is characterized in that the ionizable gas comprises a gas of the group formed by hydrogen, deuterium and deuterium hydrogen, and in that the display device is provided with means for supplying hydrogen, deuterium or deuterium hydrogen to the ionizable gas.

At the beginning of a plasma-discharge cycle in the display device, a plasma discharge is created in the compartment or in one of the compartments (for example the channels of a PALC-display) by applying a (relatively high) voltage pulse (the so-called "strobe" pulse) across the electrodes in the compartment. Charged particles are created in such a plasma discharge The voltage across and the current through the discharge reach a stationary state (the so-called "steady state") within a few $\mu s$. After switching off the plasma discharge, the grey level of each display element is checked by applying a (relatively low) voltage across the corresponding further electrode (the data electrode or the column electrode). As a result, a part of the charged particles is drawn towards the (thin) dielectric layer ("microsheet"), which causes an electric field to be formed across the electro-optical layer. As a result, the electro-optical layer is charged like a capacitor until the complete data voltage is present across the layer, causing the transparency of the electro-optical layer to change (for example, it becomes more or less transparent). The degree of transparency is determined by the value of the data voltage. After the discharge has disappeared in the so-called "afterglow", the compartment forms an insulator and the electro-optical layer remains charged. A new plasma discharge in the compartment acts as a reset of the display element.

In general, the display device comprises a number of compartments, each compartment including at least two electrodes for ionizing the gas.

Important parameters of the plasma-discharge cycle of the display device are the electric conductivity of the plasma discharge and the decay of the conductivity in the afterglow period. If the decay in conductivity of the plasma discharge takes place too slowly, the discharge may continue while a next data line is already being written, which is undesirable. Too rapid a decay of the conductivity also has adverse effects.

The (carrier) gas which is most commonly used in display devices of the type mentioned in the opening paragraph is helium (He). The ignition voltage of the plasma discharge can be reduced by adding small quantities of a gas (of the order of a few percent) to the helium. In general, the ionization potential of such gases is lower than that of helium. The resultant mixtures are referred to as Penning mixtures. A well-known additional gas is hydrogen ($H_2$). The use of such gas mixtures does not only influence the ignition characteristic of the plasma discharge but also, for example, the current necessary to maintain the discharge (the so-called sustain current) and the afterglow characteristic of the discharge.

The inventors have recognized that, as regards the service life of the display device, it is important that the composition of the ionizable gas or mixture of gases remains constant during said service life. As the concentrations of the additional gas(es) (added to the helium) are relatively low, it is desirable to take measures to ensure that the (partial) pressure of the additional gas(es) remains as constant as possible. A loss of additional gas(es) can be attributed to diffusion of such gases from the compartment of the display device, or to implantation of such gases, for example, in the electrodes, or to compounding of such gases, as a result of which they no longer contribute to the characteristic of the ionizable gas (plasma discharge, sustain voltage, afterglow characteristic). This results, in the case of hydrogen, in the formation of hydrides.

Checking the pressure of the additional gas(es) is made possible by providing the display device with means for regulating the pressure of the additional gas(es). This is preferably achieved by incorporating materials in the display device which supply hydrogen, deuterium or deuterium hydrogen.

Materials which are suitable for the purpose of the invention ensure a constant partial pressure of the additional gas, said pressure having the desired level for the ionizable gas and being at least substantially independent of the concentration of the gas in the material of the means. Examples of such suitable materials include $VZ_2$, $LZ_3$, $PdZ_{0.6}$, $LaNi_5Z_6$, $LaNi_2Z_x$, $LaCo_5Z_x$, Zr—Mn—$Z_x$ or Pd—Ag—$Z_x$, wherein L is a lanthanide and Z is hydrogen and/or deuterium. Examples of suitable lanthanum hydrides are $LaH_3$ and $CeH_3$. Other suitable hydride-forming or deuteride-forming materials are Y, Sc and Ti. Further suitable materials comprise compounds of the $L\xi_2Z_x$ and $L\xi_5Z_x$ types, wherein L is a lanthanide and $\xi$ is, for example, Ni or Co, which compounds may be stoichiometric or non-stoichiometric.

The means are preferably provided in a kind of "reservoir", for example a chamber of the display device which comprises the pump connection of the display device. The means are situated in this chamber, which is also referred to as "exhaust box", for example in the form of a layer applied to (one of) the walls of the chamber, or in the form of a pellet of the material, which regulates the partial pressure of the additional gas. As this chamber is in communication with the compartment or compartments of the display device, the partial pressure of the additional gas in each of the compartments is regulated.

Instead of using said "exhaust box" to accommodate the means, said means can alternatively be provided in the compartment itself or in the compartments themselves. An embodiment of the display device is characterized in that the means form part of the electrodes. Preferably, said electrodes are provided with a layer of said means. A material which can particularly suitably be used to cover the electrodes is $VZ_2$, wherein Z is hydrogen and/or deuterium. The volume of the electrodes is large enough to regulate the pressure of the additional gas.

These and other aspects of the invention will be apparent from and elucidated with reference to the embodiments described hereinafter.

DESCRIPTION OF THE PREFERRED EMBODIMENTS

Figure 1:
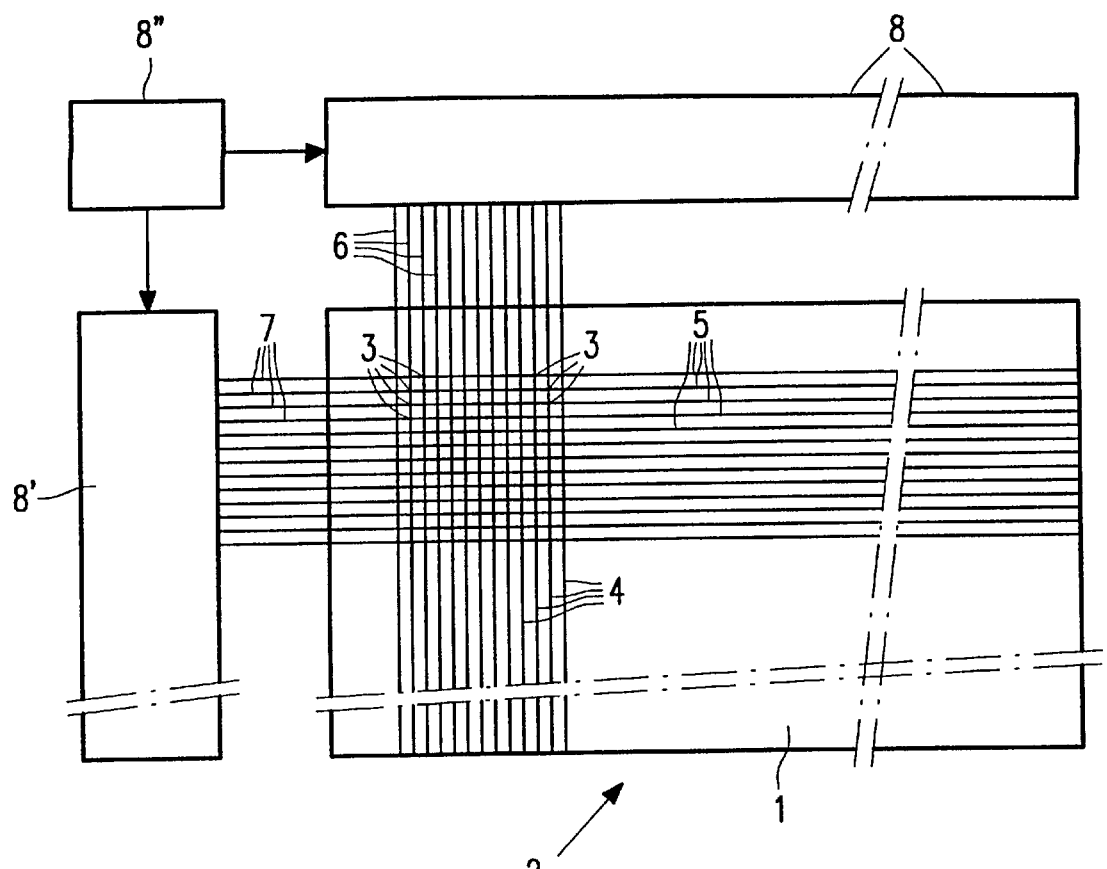
FIG. 1 schematically shows a block diagram of a display device.

The Figures are purely schematic and not drawn to scale. In particular for clarity, some dimensions are exaggerated strongly. In the Figures, like reference numerals refer to like parts, whenever possible.

FIG. 1 very schematically shows a block diagram of a conventional display device. Said display device comprises a substrate 1 with a surface 2 which is provided with a pattern of pixels which are separated from each other (the space between the pixels being predetermined) in the vertical and the horizontal direction. Each pixel 3 comprises overlapping portions of (thin, narrow) electrodes 4 of a group of electrodes arranged in vertical columns and of (thin, narrow) electrodes 5 of a further group of electrodes arranged in horizontal rows. The electrodes 4 of the group of electrodes are also referred to as column electrodes, and the electrodes 5 of the further group of electrodes are also referred to as row electrodes. In a plasma-addressed liquid-crystal display device (PALC), the rows are formed by long, narrow channels (the compartments). The pixels 3 in each of the rows of electrodes (channels) 5 represent one data line.

The width of the electrodes 4, 5 determines the dimensions of the pixels 3, which are typically rectangular in shape. Electrodes 4 receive (analog) drive signals ("data drive signals") from a drive circuit 8 via parallel conductors 6, and electrodes 5 receive (analog) drive signals ("data drive signals") from a drive circuit 8' via parallel conductors 7.

To produce a picture or a data-graphic display in a relevant region of the surface 2 of substrate 1, the display device employs a control circuit 8" ("scan control circuit") which controls the drive circuits 8, 8'. In the display device, various types of electro-optical materials may be used. Examples of electro-optical materials include (twisted) nematic or ferro-electric liquid-crystal materials. In general, the electro-optical materials attenuate the transmitted or reflected light in dependence upon a voltage applied across the material.

Figure 2:
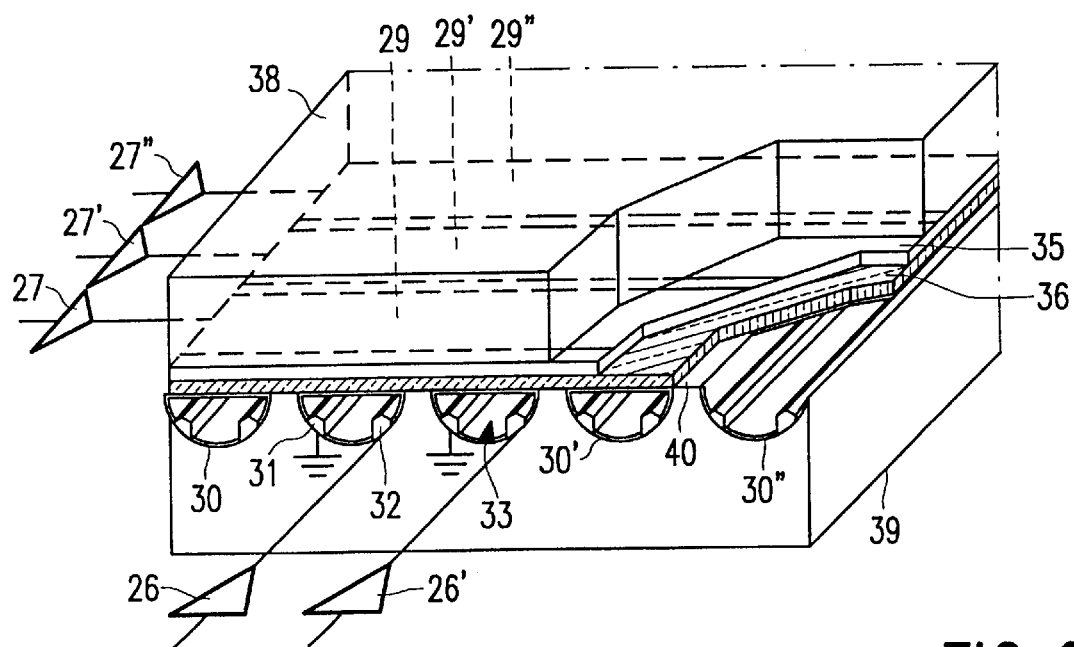
FIG. 2 is a schematic, perspective view, partly cut away, of a part of a construction of a plasma-addressed liquid-crystal display device (PALC)

FIG. 2 is a schematic, perspective view, partly cut away, of a part of a construction of a plasma-addressed liquid-crystal display device (PALC) comprising a first substrate 38 and a second substrate 39. In FIG. 2, only three column electrodes 29, 29', 29" are shown. The row electrodes which serve as selection means are formed by a number of mutually parallel elongated channels (compartments) 30, 30', 30" situated under a layer 35 of an electro-optical material. The panel comprises electric connections to the column electrodes 29, 29', 29" and to the plasma electrodes 31, 32, said column electrodes 29, 29', 29" receiving (analog) drive signals from output amplifiers 27, 27', 27", and the anode electrodes 32 in the (plasma) channels 30, 30', 30" receiving drive signals from output amplifiers 26, 26'. Each one of the (plasma) channels 30, 30', 30" is filled with an ionizable gas 33 and sealed by a thin dielectric layer ("microsheet") 36, which is made, for example, of glass. Each of the compartments (the channels) is provided at an inner surface (wall) with first and second elongated electrodes 31, 32 extending throughout the length of the channel. The second electrode 32 is referred to as the anode and a pulsed voltage, a so-called "strobe pulse", is applied to said anode, causing electrons emitted from the cathode 31 to ionize the gas, thereby forming a plasma. In an alternative embodiment, a negative (direct-current) pulse is applied to the cathode. The next channel is not energized until after the "strobe pulse" has ended and the gas is de-ionized. To reduce the duration of the cycle, the next channel is generally ionized already before the preceding channel has been (completely) de-ionized. The column electrodes 29, 29', 29" each cross an entire column of pixels, so that, in order to preclude crosstalk, the number of plasma row connections per unit of time is limited to only one.

In such display devices, helium (He) is generally used as the main constituent of the ionizable gas 33. In an alternative embodiment, nitrogen ($N_2$) is used as the carrier gas. The ignition voltage of the plasma discharge can be reduced by adding small quantities of a gas (of the order of 0.1–3%) to the helium (or nitrogen). A well-known gas which is added to the carrier gas to form so-called Penning mixtures is hydrogen ($H_2$). The use of such gas mixtures causes the properties of the plasma discharge to be influenced.

Figure 3:
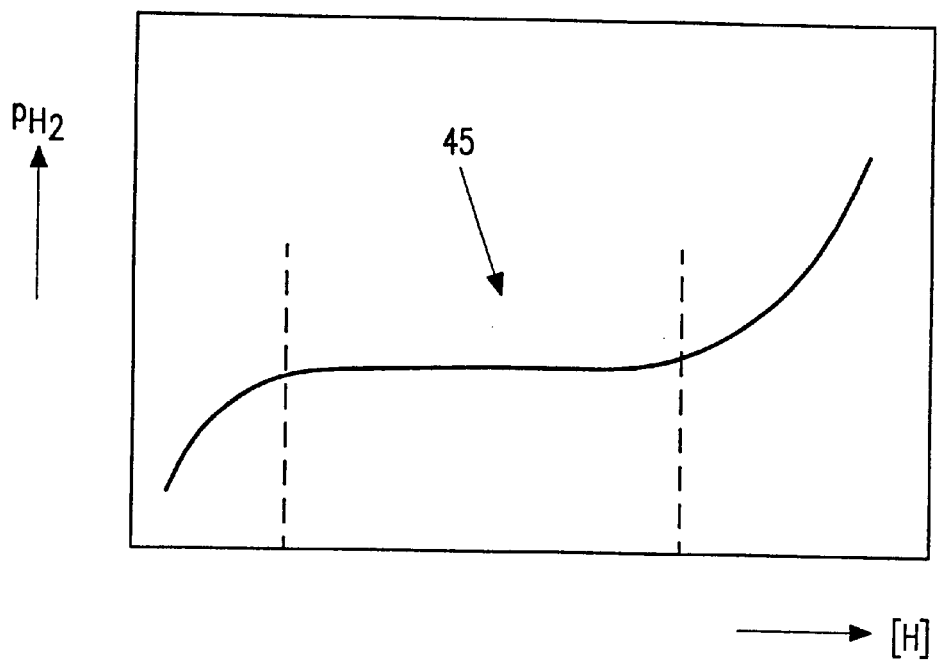
FIG. 3 shows the pressure of hydrogen as a function of the hydrogen concentration in the material.

In accordance with the invention, a gas of the group formed by $H_2$, $D_2$ and HD is added to the main constituent (carrier gas) of the ionizable gas (33), and the display device comprises means for (re-)supplying and/or regulating (the pressure of the) hydrogen, deuterium or deuterium hydrogen. Materials which can suitably be used for this purpose, alternatively referred to as guest materials, ensure a constant partial pressure of the additional gas, which pressure has the desired level for the ionizable gas and is at least substantially independent of the concentration of the gas in the material of the means. By way of example, in FIG. 3, the pressure of hydrogen $p(H_2)$ is plotted as a function of the hydrogen concentration [H] in the guest material. The center part of the curve in FIG. 3 comprises a plateau, referenced 45, where the partial pressure of the gas is at least substantially independent of the concentration of the gas in the guest material. In addition, it is desirable that the level of the plateau 45 corresponds to the desired $H_2$ partial pressure in the display device.

It is known that the addition of small quantities of said gases to helium does not only influence the ignition and sustain voltages of the plasma discharge but also, in general, the afterglow decay time τ of the plasma discharge. In this application, "afterglow decay time" is to be taken to mean the time period in which the conductivity of the plasma has decreased by a factor of 1/e. The afterglow decay time is predominantly determined by the presence of meta-stable particles and the decay thereof. Measurements have shown that additions of $H_2$, $D_2$ and/or HD have the greatest influence on the afterglow decay time of the plasma, which can be attributed to the so-called Penning reactions, in which meta-stable particles are quenched.

If the pressure of the ionizable gas in a PALC display amounts approximately to 20 kPa, the partial pressure p of the additional gas is approximately 0.4 kPa. By means of the Van 't Hof equation, the heat of generation (ΔH) of the desired material can be calculated:

$$\ln p(H_2) = \frac{\Delta H}{RT} - \text{or } \frac{\Delta S}{R}$$

$$\Delta H = RT\ln p(H_2) + T\Delta S$$

wherein R is the gas constant (R=8.3 J/mol K), T is the temperature (in K) and ΔS is the change of entropy for absorption of the additional gas (ΔS≈−130 J/mol K for $H_2$). In this manner, a temperature T=293 K and p=0.4 kPa results in a heat of generation for $H_2$ of ΔH≈−52 J/mol. All hydride-forming materials exhibiting a plateau in the desired pressure range can suitably be used as a means for (re-)supplying $H_2$, $D_2$ or HD and/or for regulating the pressure of $H_2$, $D_2$ or HD. Examples of suitable hydride-forming materials are $VH_2$, $LH_3$, $PdH_{0.6}$, $LaNi_5H_6$, $LaNi_2H_x$, $LaCo_5H_x$, Zr—Mn—$H_x$ or Pd—Ag—$H_x$, where $LH_3$ is a lanthanide hydride (for example $LaH_3$ or $CeH_3$), and one or more of the hydrogen atoms may be replaced by deuterium. For example: $VH_2$ has a heat of generation ΔH≈−54 J/mol, which under the given conditions corresponds to a partial pressure $p(H_2)$≈0.15 kPa. $PdH_{0.6}$ has a value of $p(H_2)$≈0.3 kPa. The plateaus of $LaNi_5H_6$, $LaNi_2H_x$ are above $p(H_2)$>0.1 kPa and the partial hydrogen pressure of $LaCo_5H_x$ amounts, under the given conditions, to a value of $p(H_2)$≈0.4 kPa. By producing compounds, for example, of the $LaNi_{5-x}Co_x$-type, the pressure in the display device can be set to the desired level.

Figure 4:
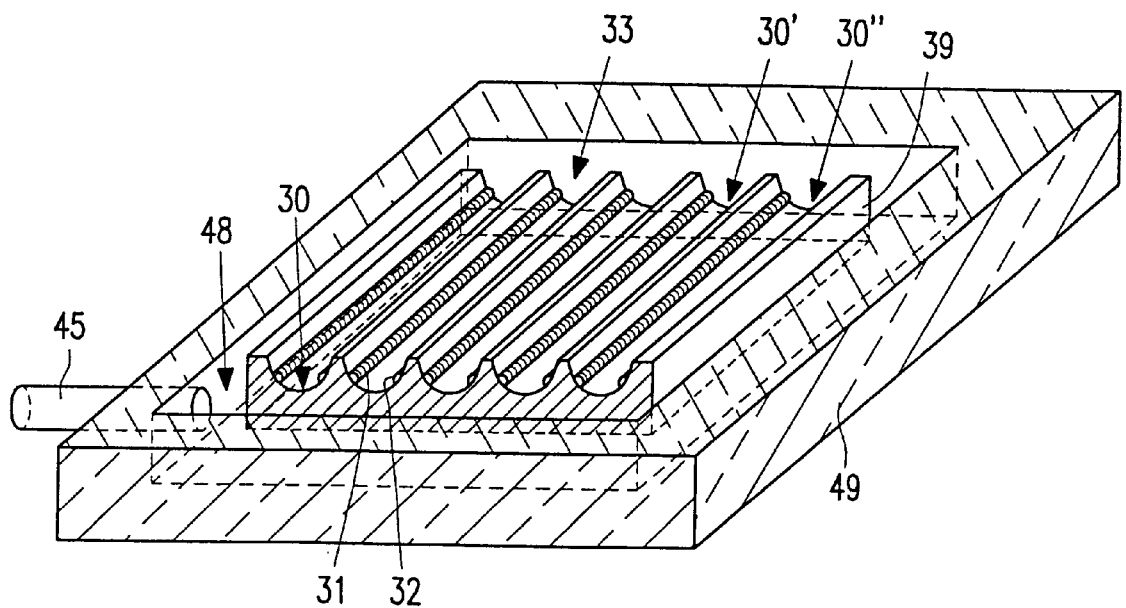
FIG. 4 is a schematic, perspective view, partly cut away, of a part of a construction of a plasma-addressed liquid-crystal display device (PALC).

FIG. 4 shows a part of the display device shown in FIG. 2, i.e. only the second substrate 39 is shown. The first substrate, the microsheet, the electro-optical layer, the column and row electrodes and the output amplifiers, etc, have been omitted for clarity. The second substrate 39 is embodied so as to be a so-called channel plate comprising a plurality of elongated channels 30, 30', 30" which are arranged so as to be mutually parallel. Each of the compartments (the channels) is provided at an inner surface (wall) with elongated electrodes 31, 32, which extend throughout the length of the channel. In the example shown in FIG. 4, the channel plate 39 is accommodated in a recess of a further substrate 49. In an alternative embodiment, the channel plate 39 and the further substrate 49 are solidly constructed. The ionizable gas 33 is contained in the channels 30, 30', 30" of the channel plate 39. In the example shown in FIG. 4, a recess or groove 48, which brings about a homogeneous gas distribution in the display device, is situated in the further substrate 49 around the channel plate 39. To fill the display device with the desired ionizable gas (mixture) and to bring the display device to the desired (under) pressure after the microsheet has been provided on the channel plate 39, the display device is provided with an "exhaust box" or "exhaust tube" 45.

The means regulating the pressure of the hydrogen, deuterium or deuterium hydrogen are preferably provided in the recess or groove 48 or in the exhaust tube 45 of the display device. Said means are situated, for example in the form of a layer, on (one of) the walls of the recess 48 or they are in the form of a pellet or wire. The above-mentioned $VH_2$ can readily be deposited as a film on a wall. $PdH_{0.6}$ can very suitably be used as a wire or a pellet, but it can alternatively be deposited as a film.

Instead of accommodating the means regulating the pressure of the hydrogen, deuterium or deuterium hydrogen in the recess 48 or the "exhaust tube" 45, said means can alternatively be provided in the channels themselves, for example, because said means form part of the electrodes 31, 32. Preferably the electrodes are provided with a layer of the means (for simplicity, these layers are not shown in FIG. 2. A particularly suitable material for covering the electrodes is $VH_2$ or $VD_2$. The volume of the electrodes is large enough to regulate the pressure of the additional gas. The advantage of coating the electrodes is that the reservoir of $H_2$, $D_2$ and/or HD is homogeneously distributed over the channels 30, 30', 30" of the channel plate 39. As the diffusion rate in the PALC displays is generally low as a result of the relatively high pressures in the channels and the relatively small dimensions of the channels, coating of the electrodes with the regulating material constitutes a very favorable embodiment of the invention.

To preclude damage as a result of cathode sputtering, a preferred embodiment of the display device is characterized in that only the anode is provided with a layer of the means, whereas the cathode is provided with a protective layer. A suitable, protective material is $LaB_6$ or $GdB_6$. Preferably, the protective layer comprises $LaB_6$ or $GdB_6$ and a glass frit.

It will be obvious that within the scope of the invention many variations are possible to those skilled in the art.

In general, the invention relates to a display device comprising a channel plate (39) having channels (30, 30', 30") containing an ionizable gas (33), and walls of the channels being provided with electrodes (31, 32) for selectively ionizing the ionizable gas (33) during operation. The display device further includes an electro-optical layer and means for activating said electro-optical layer. The display device is characterized in that the ionizable gas comprises a gas of the group formed by hydrogen, deuterium and deuterium hydrogen, and in that the display device is provided with means for supplying hydrogen, deuterium or deuterium hydrogen to the ionizable gas. Suitable materials include $VZ_2$, $LZ_3$, $PdZ_{0.6}$, $LaNi_5Z_6$, $LaNi_2Z_x$, $LaCo_5Z_x$, Zr—Mn—$Z_x$ or Pd—Ag—$Z_x$, where L is a lanthanide and Z is hydrogen and/or deuterium. The means are preferably situated in a recess (48) around the channel plate, in the pump connection (45) and/or they form part of the electrodes.

What is claimed is:

1. A display device comprising at least one compartment (30, 30', 30") containing an ionizable gas (33), walls of the compartment (30, 30', 30") being provided with electrodes (31, 32) for selectively ionizing the ionizable gas (33), during operation, and comprising an electro-optical layer (35) of an electro-optical material, and means for activating the electro-optical layer (35), characterized in that the ionizable gas (33) comprises a gas of the group formed by hydrogen, deuterium and deuterium hydrogen, and in that the display device is provided with means for supplying hydrogen, deuterium or deuterium hydrogen to the ionizable gas during normal operation.

2. A display device as claimed in claim 1, characterized in that the means regulate the pressure of the hydrogen, deuterium or deuterium hydrogen.

3. A display device as claimed in claim 1, characterized in that the means comprise a material supplying hydrogen, deuterium or deuterium hydrogen.

4. A display device as claimed in claim 3, characterized in that the material is selected from the group formed by $VZ_2$, $LZ_3$, $PdZ_{0.6}$, $LaNi_5Z_6$, $LaNi_2Z_x$, $LaCo_5Z_x$, Zr—Mn—$Z_x$ and Pd—Ag—$Z_x$, where L is a lanthanide and Z is hydrogen and/or deuterium.

5. A display device as claimed in claim 1, characterized in that the means are situated in a chamber (48) comprising a pump connection (45).

6. A display device as claimed in claim 1, characterized in that the means form part of the electrodes (31, 32).

7. A display device as claimed in claim 6, characterized in that the electrodes (31, 32) are provided with a layer of the means.

8. A display device as claimed in claim 6, characterized in that only the anode is provided with a layer of the means.

9. A display device as claimed in claim 8, characterized in that the cathode is provided with a protective layer.

10. A display device as claimed in claim 9, characterized in that the protective layer comprises $LaB_6$ or $GdB_6$ or, $LaB_6$ or $GdB_6$ and a glass frit.

11. A display device comprising:
a plurality of elongated compartments (30, 30', 30") each containing an ionizable gas (33), walls of each the compartments (30, 30', 30") being provided with respective electrodes (31, 32) for selectively ionizing the ionizable gas (33) in the respective compartment during operation, each compartment defining a respective dimension of at least one pixel, an electro-optical layer (35) of an electro-optical material which, in response to application of a voltage across the material, attenuates transmitted or reflected light, and means for activating the electro-optical layer (35), characterized in that, to influence at least one of the ignition characteristics, sustain current characteristic, and afterglow characteristics of the plasma discharge, the ionizable gas (33) comprises a selected gas selected from the group consisting of hydrogen, deuterium and deuterium hydrogen, and the display device comprises means for supplying said selected gas to the ionizable gas during normal operation.

12. A display device as claimed in claim 11, characterized in that said means regulates the pressure of the hydrogen, deuterium or deuterium hydrogen.

13. A display device as claimed in claim 11, characterized in that said means comprise a material supplying hydrogen, deuterium or deuterium hydrogen.

14. A display device as claimed in claim 13, characterized in that the material is selected from the group formed by $VZ_2$, $LZ_3$, $PdZ_{0.6}$, $LaNi_5Z_6$, $LaNi_2Z_x$, $LaCo_5Z_x$, Zr—Mn—$Z_x$ and Pd—Ag—$Z_x$, where L is a lanthanide and Z is hydrogen and/or deuterium.

15. A display device as claimed in claim 14, characterized in that said means form part of the electrodes (31, 32).

16. A display device as claimed in claim 11, characterized in that the anode electrode (32) is provided with a layer of said means.

17. A display device as claimed in claim 16, characterized in that the cathode is provided with a protective layer.

18. A display device as claimed in claim 17, characterized in that the protective layer comprises $LaB_6$ or $GdB_6$ or, $LaB_6$ or $GdB_6$ and a glass frit.

19. A display device as claimed in claim 16, characterized in that said means regulates the pressure of the hydrogen, deuterium or deuterium hydrogen.

20. A display device as claimed in claim 19, characterized in that the cathode is provided with a protective layer comprising $LaB_6$ or $GdB_6$ or, $LaB_6$ or $GdB_6$ and a glass frit.

* * * * *